United States Patent
Bao

(10) Patent No.: US 9,207,783 B2
(45) Date of Patent: Dec. 8, 2015

(54) SYNCHRONOUS LIGHT PEN ELECTRONIC WHITEBOARD SYSTEM

(75) Inventor: Wei Bao, Jiangsu (CN)

(73) Assignee: NANJING FRENTEC CO., LTD., Nanjing, Jiangsu (CN)

( * ) Notice: Subject to any disclaimer, the term of this patent is extended or adjusted under 35 U.S.C. 154(b) by 201 days.

(21) Appl. No.: 13/982,071

(22) PCT Filed: Feb. 10, 2012

(86) PCT No.: PCT/CN2012/071002
§ 371 (c)(1),
(2), (4) Date: Jul. 26, 2013

(87) PCT Pub. No.: WO2012/136084
PCT Pub. Date: Oct. 11, 2012

(65) Prior Publication Data
US 2013/0307830 A1    Nov. 21, 2013

(30) Foreign Application Priority Data
Apr. 6, 2011 (CN) .......................... 2011 1 0084577

(51) Int. Cl.
*G06F 3/0354* (2013.01)
*G06F 3/042* (2006.01)
*G06F 3/038* (2013.01)

(52) U.S. Cl.
CPC .......... *G06F 3/03542* (2013.01); *G06F 3/0386* (2013.01); *G06F 3/0425* (2013.01)

(58) Field of Classification Search
CPC ............ G06F 3/03542; G06F 3/03545; G06F 3/0425; G06F 3/0386
USPC ......................................................... 345/179
See application file for complete search history.

(56) References Cited

U.S. PATENT DOCUMENTS 5,051,736 A *  9/1991  Bennett et al. ................ 345/180
2012/0176311 A1*  7/2012  Bittenson et al. ............. 345/158

FOREIGN PATENT DOCUMENTS

| CN | 2611974 Y | 4/2004 |
| CN | 2676276 Y | 2/2005 |
| JP | 9-160721 A | 6/1997 |

* cited by examiner

*Primary Examiner* — Larry Sternbane
(74) *Attorney, Agent, or Firm* — Novick, Kim & Lee, PLLC; Allen Xue

(57) ABSTRACT

The synchronous optical pen electronic whiteboard system in the present invention introduces an image sensor with a global shutter, optical pen pulsing light-emission and synchronizing signal transmitter and receiver. The light pulsing of the optical pen and the exposure of the image sensor coincide by synchronizing signal so as to realize the object of increasing signal-to-noise-ratio. A synchronizing signal sender can be arranged in the optical pen and a synchronizing signal receiver arranged in a signal receiving device, or a synchronizing signal sender can be arranged in the signal receiving device and a synchronizing signal receiver arranged in the optical pen. The coincidence of light pulsing and the exposure can be realized in the two solutions, thereby realizing the object of the present invention. By using the solution of the present invention, the power consumption of the optical pen can be reduced effectively and the signal to noise ratio of the system can be effectively increased in the meanwhile.

8 Claims, 2 Drawing Sheets

SYNCHRONOUS LIGHT PEN ELECTRONIC WHITEBOARD SYSTEM

TECHNICAL FIELD

The present invention relates to an electronic whiteboard system, specifically a synchronous optical pen electronic whiteboard system adopting optical imaging technology.

TECHNICAL BACKGROUND

The electronic whiteboard system adopting optical imaging technology is realized through optical pen position tracking, see the China patent of the "System and Method for Computer Information Input Coordinate & Control" with the patent No. ZL011080477 and patent publication No. CN1305143A for detailed information. The operating principle: the target positions are marked by light spots generated by the optical pen, and a photographic device is adopted to collect images in real time. The signal processing circuit is used to analyze image signals in real time and extract the position information of the light spots, which is input into the computer through the interface circuit and the relative software. The coordinate correction algorithm is applied to perform calibration so that the position of the cursor can track the physical position of the optical pen. The current technology generally introduces an optical band-pass filter to ensure the best utilization of spectral energy and the best filtration of ambient light energy for the sake of high signal-noise-ratio (SNR) and operation stability, or increases the SNR by amplifying the light-emitting power. However there is a limit in the effect of using filters since light disturbance is still liable to occur under a certain luminance of the optical pen with possible strong ambient light and in addition, if the light-emitting power is increased too much, the power consumption will be high and the battery will be quickly drained. So a better method for further increasing the SNR should be developed.

INVENTION DETAILS

The purpose of the present invention is to provide a synchronous optical pen electronic whiteboard system wherein the SNR can be improved without increasing the light-emitting power.

In order to reach the above target, a global shutter image sensor, as for the present invention, is installed on the signal receiving device of the synchronous optical pen electronic whiteboard system, the optical pen emits light by pulsing and the synchronizing signal sender and receiver are introduced, the pulsed light-emission of the optical pen and the exposure of the image sensor can happen synchronously through the synchronizing signals, thus SNR can be raised. There are two technical solutions: 1) A synchronous optical pen electronic whiteboard system, including the signal receiving device and optical pen, where the signal receiving device mainly comprises the receiving & processing circuit and a camera that is connected to the former, and the optical pen mainly comprises the head light emitting apparatus and optical pen circuit; wherein a synchronizing signal receiver in the signal receiving device is connected to the said receiving & processing circuit and the image sensor in the said camera allows global exposure, a corresponding synchronizing signal sender is installed in the said optical pen, the optical pen emits light by pulsing. 2) A synchronous optical pen electronic whiteboard system, including the signal receiving device and optical pen, where the signal receiving device mainly comprises the receiving & processing circuit and a camera that is connected to the former, and the optical pen mainly comprises the head light emitting apparatus and optical pen circuit; wherein the image sensor in the said camera allows global exposure, a synchronizing signal sender in the signal receiving device is connected to the said receiving & processing circuit, and a corresponding synchronizing signal receiver is installed in the said optical pen that emits light by pulsing.

As for both solutions, the synchronizing signals allow the coincidence of the exposure of the image sensor and the light pulsing of the optical pen. So suppose the exposure time of each pixel, the image collection period and the effective intensity of the ambient light are T_shut, T and Ie respectively, the SNR of the system, as for the present invention, will be (T_shut*Ip)/(T_shut*Ie)=Ip/Ie, the average power consumption of the optical pen will be a*Ip*T_shut, where a refers to a constant coefficient and Ip refers to the average light intensity within the pulse time of the optical pen. However, as for current technology, suppose the continuous light intensity is Is, the SNR will be indicated as (T_shut*Is)/(T_shut*Ie)=Is/Ie, the average power consumption of the optical pen will be a*Is*T. According to the above formula, if Ip=Is, T_shut=T/4, the SNRs as for the present invention and current technology are the same, however the power consumption of the optical pen decreases by 75% compared with that of current technology, i.e. when the SNR is kept, the power consumption of the optical pen for the system of the present invention decreases greatly, prolonging the power supply time. If the light-emitting power doubles during the optical pen pulsed light-emission, i.e. Ip=Is*2 and also T_shut=T/4, the SNR for the system of the present invention can also be doubled while the average power consumption of the optical pen can decrease by 50%, i.e. the SNR can be increased when the power consumption of the pen is decreased if the relevant parameters are set properly. If the circuit gain is increased and further shortening of exposure time is made, the SNR can be increased or the average power consumption of the optical pen can be decreased.

When the solutions of the present invention are adopted, the power consumption of the optical pen can be decreased, the power supply time prolonged and the SNR of the system increased effectively, improving the product's properties greatly, so the practical value of the present invention can be known.

ATTACHED FIGURES

Figure 1:
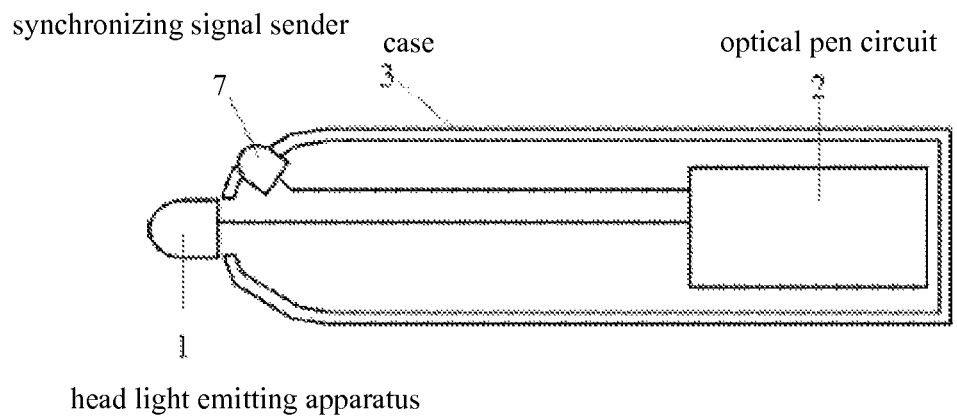
FIG. 1 shows the structural representation for the optical pen of the synchronous optical pen electronic whiteboard system of the first embodiment of the present invention.

Where: head light emitting apparatus 1, optical pen circuit 2, case 3, synchronizing signal receiver 4, camera 5, receiving & processing circuit 6, synchronizing signal sender 7.

DETAILED DESCRIPTION OF THE PREFERRED EMBODIMENTS

Further description about the present invention is made based on the following attached figures and examples.

Figure 2:
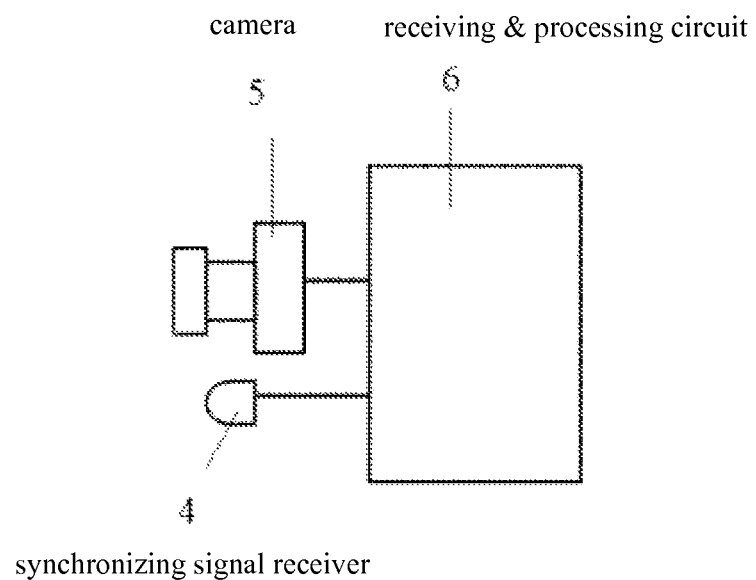
FIG. 2 shows the structural representation for the signal receiving device of the first embodiment of the present invention.

Both FIGS. 1 and 2 show the embodiment of the structural representation for the synchronous optical pen electronic whiteboard system of the present invention. The head light emitting apparatus (1) is an IR emitting tube that is set on the pen head and connected to the optical pen circuit (2) in the case (3), which is a common arrangement for current technologies. The optical pen circuit (2) is a circuit that is formed by an MCU core. Under the control of the MCU, when the optical pen emits light, the light-emitting pulse width and period are approx. 5 ms and 20 ms respectively, where each pulse is modulated at the carrier of 38 KHz. The synchronizing signal receiver (4) is a common 38 KHz IR receiving module used for IR remote control, which is connected to the receiving & processing circuit (6). When the light-emitting pulse of a optical pen reaches the said IR receiving module, it will perform signal output under the carrier of 38 KHz. The camera (5) comprises a CMOS image sensor MT9V034 featuring global shutter, a lens and a filter etc., where the image sensor MT9V034 is operated under the Slave mode, and under the control of the receiving & processing circuit (6), the exposure is only allowed when carrier signals are received, thus the light-emission of the optical pen and the exposure of the camera can be performed synchronously.

In this embodiment, the exposure period and light-emitting pulse width are 20 ms and 5 ms respectively. The light intensity within the pulse is twice that of current optical pens, so the average power consumption is about ½ that of current optical pens. The SNR of the system is doubled i.e. when the power consumption of the optical pen is decreased by 50%, the SNR of the system is increased by 100%, improving the properties of the system greatly. As for the above embodiment, the IR carrier emission is performed by the light-emitting apparatus of the pen head that is also a synchronizing signal sender, simplifying the use of hardware and realizing efficient operation. However, if the pen head emits non-IR light, an independent IR emitting tube is needed and used as the synchronizing signal sender. The synchronizing signals can also be sent or received by RF sending modules and RF receiving modules.

Figure 3:
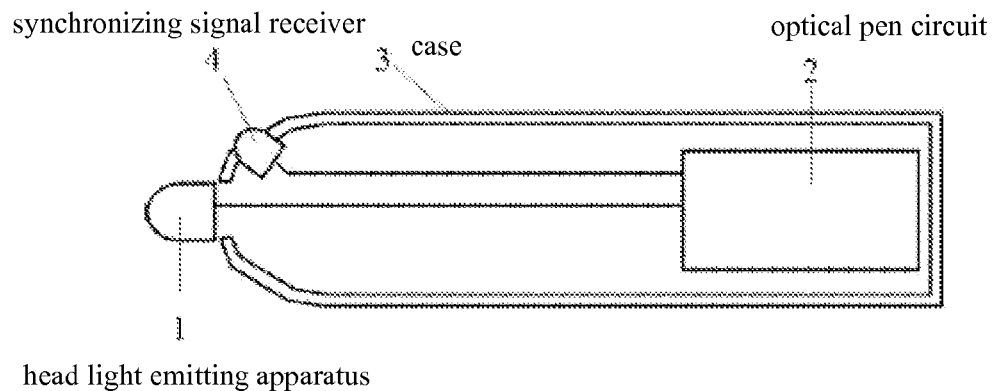
FIG. 3 shows the structural representation for the optical pen of the synchronous optical pen electronic whiteboard system of the second embodiment of the present invention.
Figure 4:
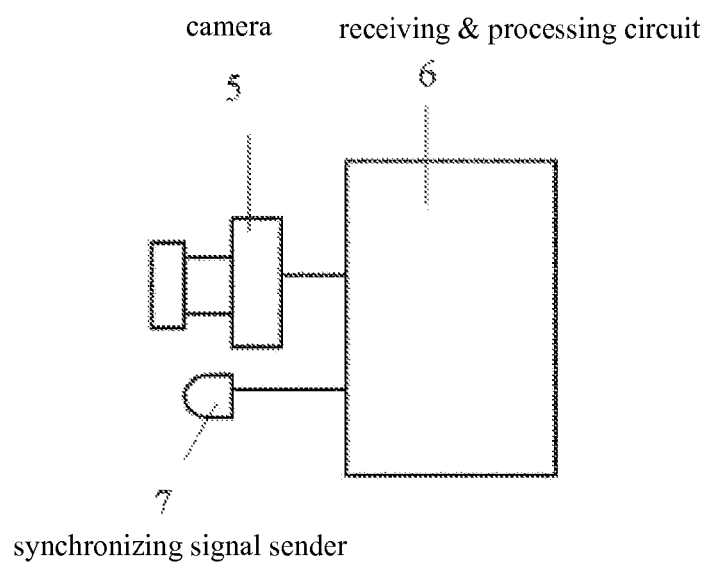
FIG. 4 shows the structural representation for the signal receiving device of the second embodiment of the present invention.

As for the second embodiment of the present invention, the synchronous signals are sent by the synchronizing signal sender (7) of the signal receiver, while for the optical pen, a relevant synchronizing signal receiver (4) is provided, which can also allow synchronization between the light-emission of the optical pen and exposure of the camera, reaching the goal of the present invention. The advantage of this solution is that several pens can be used at the same time based on an appropriate instructional design since the synchronous signals can be received by several pens, see FIGS. 3 and 4.

Though preferred embodiments in relation to the present invention are shown as above, the present invention is not limited to these embodiments and attached figures. Changes or modification of the operation conducted by skilled operators should be subject to the principles, range and protection domain of the present invention and therefore the protection domain of the present invention should be kept within the scope of the claims.

The invention claimed is:

1. A synchronous optical pen electronic whiteboard system, comprising a signal receiving device and an optical pen,
    wherein the signal receiving device comprises a receiving & processing circuit, and a camera having a global shutter CMOS image sensor and a synchronizing signal receiver, and
    wherein the optical pen emits light pulses and comprises a head light emitting apparatus, an optical pen circuit, and a synchronizing signal sender, wherein the synchronizing signal receiver is configured to receive signals from the synchronizing signal sender,
    wherein the optical pen and the signal receiving device are coordinated through the synchronizing signal sender and the synchronizing signal receiver so that a duration of the light pulse and an exposure time of the global shutter CMOS image sensor are synchronized.

2. The synchronous optical pen electronic whiteboard system according to claim 1, wherein the said synchronizing signal sender is an IR emitting tube and the said synchronizing signal receiver is an IR receiving module.

3. The synchronous optical pen electronic whiteboard system according to claim 2, wherein the said synchronizing signal sending apparatus and head light-emitting apparatus are the same IR sending tube.

4. The synchronous optical pen electronic whiteboard system according to claim 1, wherein the said synchronizing signal sender is an RF emitting module and the said synchronizing signal receiver is an RF receiving module.

5. The synchronous optical pen electronic whiteboard system according to claim 1, wherein the global shutter CMOS image sensor is controlled by the receiving & processing circuit so that the global shutter CMOS image sensor is exposed only when the synchronizing signal receiver receives a signal emitted from the synchronizing signal sender.

6. A synchronous optical pen electronic whiteboard system, comprising a signal receiving device and an optical pen,
    wherein the signal receiving device comprises a receiving & processing circuit, a camera having a global shutter CMOS image sensor, and a synchronizing signal sender connected to the receiving & processing circuit, and
    wherein the optical pen emits light pulses and comprises a head light emitting apparatus, an optical pen circuit, and a synchronizing signal receiver configured to receive signals sent from the synchronizing signal sender,
    wherein the optical pen and the signal receiving device are coordinated through the synchronizing signal sender and the synchronizing signal receiver so that a duration of the light pulse and a exposure time of the global shutter CMOS image sensor are synchronized.

7. The synchronous optical pen electronic whiteboard system according to claim 6, wherein the said synchronizing signal sender is an IR emitting tube and the said synchronizing signal receiver is an IR receiving module.

8. The synchronous optical pen electronic whiteboard system according to claim 6, wherein the said synchronizing signal sender is an RF emitting module and the said synchronizing signal receiver is an RF receiving module.

* * * * *